(12) United States Patent
Siglock (10) Patent No.: US 9,548,629 B2
(45) Date of Patent: *Jan. 17, 2017

(54) ENERGY INTERFACE SYSTEM

(71) Applicant: Milbank Manufacturing Co., Kansas City, MO (US)

(72) Inventor: John V. Siglock, Kansas City, MO (US)

(73) Assignee: Milbank Manufacturing Co., Kansas City, MO (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/554,819

(22) Filed: Nov. 26, 2014

(65) Prior Publication Data

US 2015/0084418 A1    Mar. 26, 2015

Related U.S. Application Data

(63) Continuation of application No. 13/361,653, filed on Jan. 30, 2012, now Pat. No. 8,901,772.

(Continued)

(51) Int. Cl.
*H02J 9/06* (2006.01)
*H02J 3/38* (2006.01)
(Continued)

(52) U.S. Cl.
CPC ............ *H02J 9/061* (2013.01); *H02J 3/383* (2013.01); *H02J 3/386* (2013.01); *H02J 13/002* (2013.01);
(Continued)

(58) Field of Classification Search
CPC ...................................................... H02J 7/00
(Continued)

(56) References Cited

U.S. PATENT DOCUMENTS 6,925,361 B1    8/2005   Sinnock
7,274,975 B2    9/2007   Miller
(Continued)

FOREIGN PATENT DOCUMENTS

JP    H10-133710 A     5/1998
JP    2003-319572 A    11/2003
(Continued)

OTHER PUBLICATIONS

International Search Report and Written Opinion regarding PCT/US2012/023155, dated May 29, 2012.
(Continued)

*Primary Examiner* — Robert Deberadinis
(74) *Attorney, Agent, or Firm* — Polsinelli PC; Derek D. Donahoe (57) ABSTRACT

Aspects of the present disclosure involve systems, methods, and the like, for an energy interface system for interfacing alternative energy sources with a utility power source on a premises. The energy interface system provides flexibility in the use and distribution of utility energy sources and alternative energy sources based on several measurements and criteria of the interface system. For example, the energy interface system may allow for the energy consumption to adapt to changing parameters, such as utility rate schedules, cost of alternative fuels and utility premiums for consumption or generation of energy at particular times. The energy interface system also allows for deferment of charging or other high-energy loads to be recognized by the system at otherwise low-energy times. In addition, the energy interface system allows for monitoring and communication with the system for ease of configuring the system based on one or more criteria or measurements.

22 Claims, 8 Drawing Sheets

Related U.S. Application Data (60) Provisional application No. 61/591,035, filed on Jan. 26, 2012, provisional application No. 61/438,179, filed on Jan. 31, 2011.

(51) Int. Cl.
  *H02J 13/00* (2006.01)
  *H02J 7/00* (2006.01)
  *H02J 3/32* (2006.01)
  *H02J 9/08* (2006.01)

(52) U.S. Cl.
  CPC ............. *H02J 13/0075* (2013.01); *H02J 3/32* (2013.01); *H02J 9/08* (2013.01); *Y02B 10/72* (2013.01); *Y02B 90/222* (2013.01); *Y02E 10/563* (2013.01); *Y02E 10/566* (2013.01); *Y02E 10/763* (2013.01); *Y02E 40/72* (2013.01); *Y02E 60/722* (2013.01); *Y02E 60/7815* (2013.01); *Y02E 60/7853* (2013.01); *Y04S 10/123* (2013.01); *Y04S 10/14* (2013.01); *Y04S 20/12* (2013.01); *Y04S 40/121* (2013.01); *Y04S 40/126* (2013.01); *Y10T 307/344* (2015.04); *Y10T 307/615* (2015.04); *Y10T 307/62* (2015.04); *Y10T 307/747* (2015.04)

(58) Field of Classification Search
  USPC .......................................................... 307/65
  See application file for complete search history.

(56) References Cited

U.S. PATENT DOCUMENTS

| | | |
|---|---|---|
| 7,446,437 B2 | 11/2008 | Palk et al. |
| 7,566,986 B2 | 7/2009 | De Boer et al. |
| 7,590,472 B2 | 9/2009 | Hakim et al. |
| 7,612,466 B2 | 11/2009 | Skutt |
| 8,700,224 B2 | 4/2014 | Mathiowetz |
| 8,901,772 B2 * | 12/2014 | Siglock .................. H02J 3/386 307/65 |
| 2007/0155349 A1 | 7/2007 | Nelson et al. |
| 2010/0002348 A1 | 1/2010 | Donolo et al. |
| 2010/0198535 A1 | 8/2010 | Brown et al. |

FOREIGN PATENT DOCUMENTS

| | | |
|---|---|---|
| JP | 2008-283741 A | 11/2008 |
| JP | 2010-11558 A | 1/2010 |
| WO | WO 2007074541 | 7/2007 |

OTHER PUBLICATIONS

Official Letter regarding CN201280014550.8, dated Mar. 12, 2015.
Examination Report regarding AU2012212484, dated Sep. 1, 2015.
Official Letter regarding CN201280014550.8, dated Oct. 27, 2015.
Office Action regarding JP2013-551415, dated Nov. 24, 2015.

\* cited by examiner

ENERGY INTERFACE SYSTEM

CROSS-REFERENCE TO RELATED APPLICATION

This application is a continuation and claims priority to copending U.S. patent application Ser. No. 13/361,653 entitled "ENERGY INTERFACE SYSTEM", naming John V. Siglock as inventor and filed on Jan. 30, 2012. the entirety of which is hereby incorporated by reference herein, which claims priority under 35 U.S.C. 119(e) to U.S. Provisional Application, Ser. No. 61/438,179 for ENERGY INTERFACE SYSTEM filed Jan. 31, 2011 and U.S. Provisional Application, Ser. No. 61/591,035 for ENERGY INTERFACE SYSTEM CIRCUITS filed Jan. 26, 2012. both of which are incorporated herein in its entirety by reference.

TECHNICAL FIELD

Embodiments of the present disclosure relate to systems and methods related to connecting to utility power sources. More specifically, the present disclosure relates to an energy interface system and method for interfacing alternative energy sources with a utility power source on a premises.

BACKGROUND

Typically, residences, office buildings, apartment buildings and the like connect to a regional utility that provides power to buildings. This connection to the utility is generally through a meter that measures the amount of energy consumed by the connecting customer for billing purposes. However, recent trends have included adding to a typical utility power source on a premises by connecting renewable energy sources, standby power sources and/or electrical vehicles, among others, to reduce the amount of energy received from the utility and/or to compensate for a loss of power at the utility connection. For example, renewable energy sources, such as wind, solar and hydro-electric, may be generated on premises and may reduce the amount of power needed from the utility. Standby sources of power, such as fossil fuel motor-generators and battery-based sources, may be utilized as back-up energy sources when the utility power connection fails.

Additionally, many of these renewable or standby power sources may provide energy back to the utility that may then be provided to other customers of the utility. For example, electrical vehicles may function as a source of power to the premises as well as consume power, similar to battery-based storage. Also, energy generated by a wind, solar or hydro-electric source may be provided back to the utility and credited to offset the cost of the energy consumed on the premises.

Figure 1A:
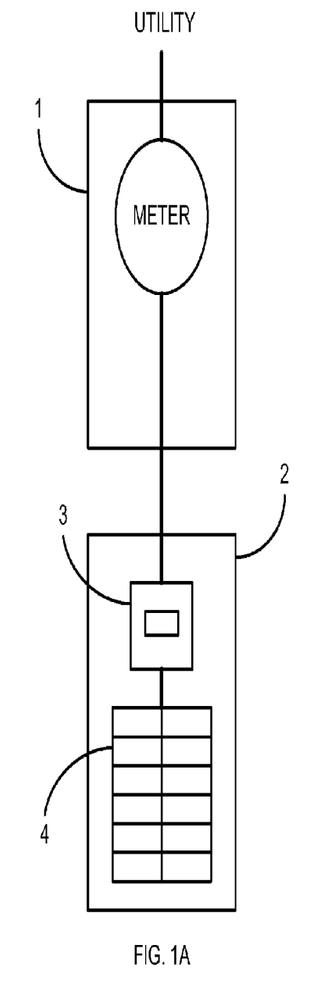
FIG. 1A, 1B, 1C are schematic diagrams illustrating prior art utility power source installations before any additional alternative energy sources are added.
Figure 1B:
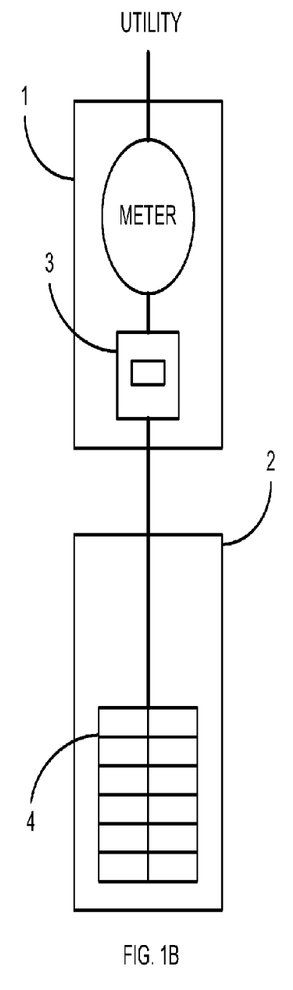
Figure 1C:
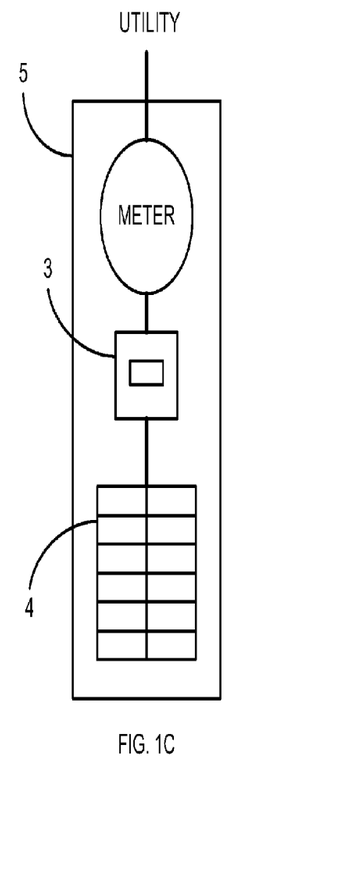

FIGS. 1A, 1B and 1C illustrate typical existing utility power source installations before any additional alternative energy sources are added to the connection. The most common construction in the United States is currently represented by FIG. 1A. FIGS. 1B and 1C represent less common constructions that may still occur. Each system depicted in FIGS. 1A, 1B and 1C contains a meter socket and meter 1 connected to a load center 2. The load center 2 may include a main circuit breaker 3 and a plurality of branch circuit breakers 4 that provide the access points to the utility power. In FIG. 1A, the main circuit breaker 3 is located within the load center, while in FIG. 1B the main circuit breaker is located within the meter 1. In FIG. 1C, the meter and load center 2 are combined in what is referred to in the trade as a "meter-main-load center" or an "all-in-one" 5. Recent changes in the National Electric Code (NEC) require that no more than 20% of the panel rating in additional power sources be added, and that the addition is only permitted at the furthest point from the normal input. These changes thus limit the additional power sources to two sources.

Figure 2:
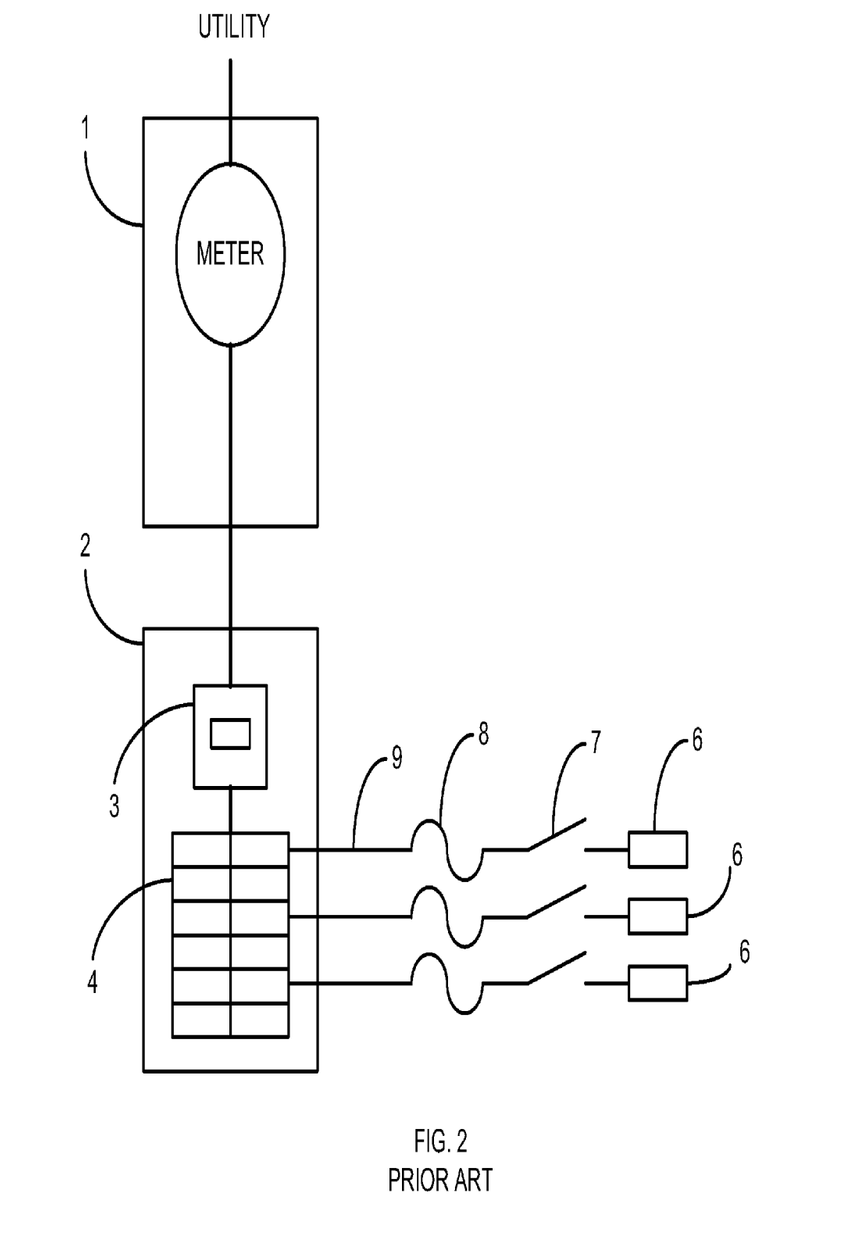
FIG. 2 is a schematic diagram illustrating a prior art system in which several alternative energy sources are added to a utility power source installation.

FIG. 2 illustrates a prior art utility power source installation including several alternative energy sources connected to several of the plurality of branch circuit breakers 4. In the example, an alternative energy source 6 is connected to the premises electrical system through an external disconnect switch 7, which is typically required by the National Electric Code. Each switch 7 connects to the branch circuit breakers 4 in the load center 2 through a conductive line 9 and an over-current protective device 8, such as a fuse or circuit breaker. Thus, the alternative energy source 6 is connected to the load center 2 through the disconnect switch 7, the over-current protective device 8 and the conductive line 9. Shown in FIG. 2 are three separate alternative energy sources 6 connected to the branch circuit breakers 4 in this manner.

Figure 3:
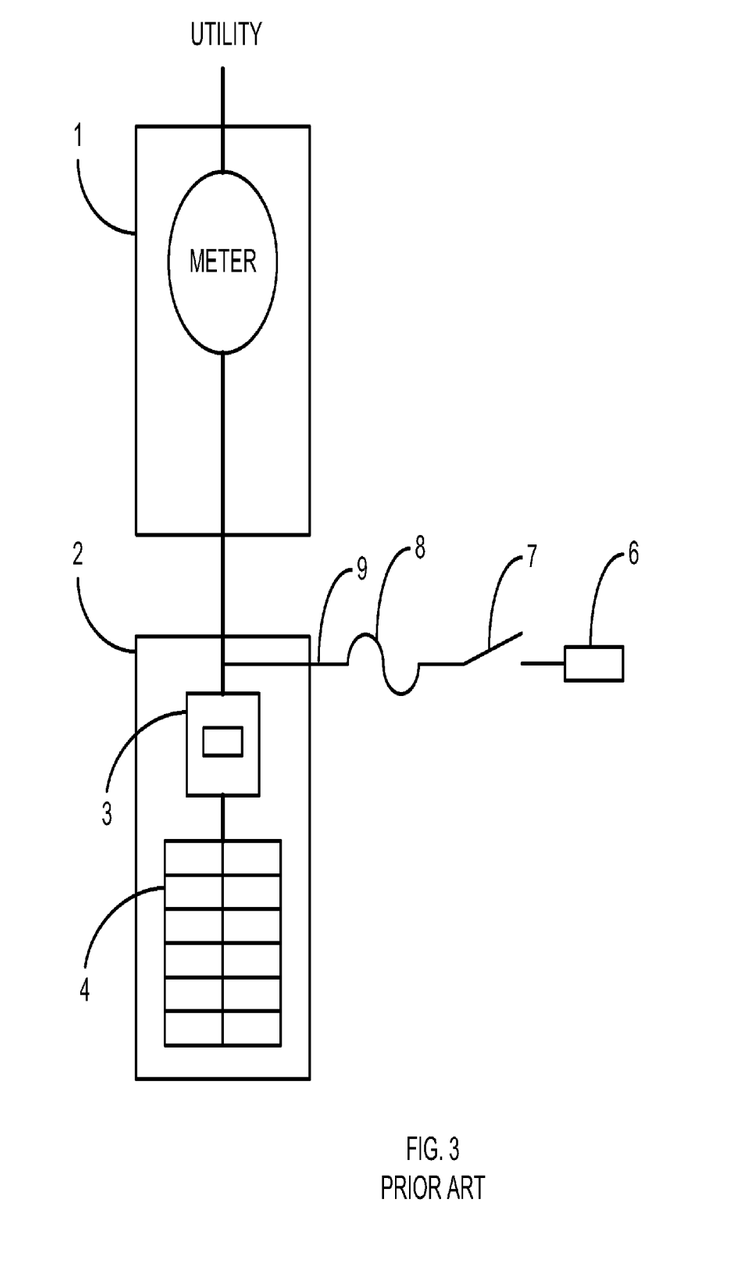
FIG. 3 is a schematic diagram illustrating an alternative prior art connection for alternative energy sources are added to a utility power source installation.

FIG. 3 shows another connection method that is known in the art. In some instances spaces in the branch circuit breaker 4 may not be available for use, such as if each of the plurality of branch circuit breakers are already connected or reserved. In this instance, the alternative energy source 6 may be connected at the line side of the main circuit breaker 3 using the disconnect switch 7, the over-current protective device 8 and the conductive line 9 discussed above with reference to FIG. 2. However, in this configuration, the utility power supply provided through the meter socket 1 would likely energize the circuit such that this connection configuration is not desired.

Several disadvantages exist for the prior art installation configurations discussed above. For example, the above connection configurations require a separate externally accessible disconnect switch 7 for each alternative energy device. Also, in typical load-centers 2, the circuit breakers 4 used for connection consume a space in the load center 2 that may be originally intended to be available for a premises load connection of a device. As a result, not enough spaces may exist in the load center 2 to connect all the devices. Another potential disadvantage of the prior art is that it may not provide information to a user regarding the amount of energy consumed or generated at a premises.

In addition, the prior art systems of connecting the alternative energy source to the utility connector is that it is "hard-wired" and thus has no ability to adapt to changing parameters such as utility rate schedules, cost of alternate fossil fuels, and possible utility premiums for consumption or generation of power at specific times. Also, the prior art connection systems cannot generally defer loads, such as an electric vehicle charging, until low demand hours to help relieve loading of the utility grid. While it would be possible to rewire a system to adapt to changing parameters, it would involve the use of an electrician, more hardware, and substantial costs to the customer.

SUMMARY OF THE INVENTION

In view of the above, it will be apparent to those skilled in the art from this disclosure that there exists a need for an energy interface system for interfacing alternative energy sources with a utility power source on a premises.

There is a need to reduce installation costs by replacing multiple disconnect switches, each to an alternative energy source, with an externally accessible circuit breaker which provides both the over-current and disconnect functions for the alternative energy source.

There is also a need to reduce installation costs by reducing or eliminating the number of wires and/or conduits required to interface multiple alternative energy sources.

There is also a need to provide electronic, revenue grade metering of all sources of loads connected to the system.

There is also a need to make these meter readings available remotely, such as on the Internet, through a PDA application or other remote wireless device.

There is also a need to provide capability for autonomous operation of the electronic switches.

There is also a need to provide local storage of operating parameters.

It is also desirable to provide the capability to connect to a world wide web-based site to allow system registration, selection of operating preferences, storage and retrieval of operational data such as kilowatt-hour performance of each device in the system, software updates, provisions for maintenance alerts and many other valuable functions.

One aspect of this disclosure permits expansion of the system for larger commercial or industrial installations through a wired interface (such as RS485) and still allow one web interface for all units.

Another aspect of this disclosure permits communications with other loads or devices that are remote from and not directly wired to the energy interface system, such as thermostats and appliances, either wirelessly, through PLCC (power line carrier communication) based interfaces or other optional methods.

One embodiment of the present disclosure comprises a control module connected to a plurality of slave modules. Each of the plurality of slave modules includes a switching device. The embodiment also includes a plurality of circuit breakers electrically connected to the plurality of slave modules and configured to provide an electrical junction between the switching device and an electrical system and a control bus configured to transmit one or more control signals from the control module to at least one of the plurality of slave modules. Further, the control signals are configured to enable the switching device of at least one of the plurality of slave modules to provide energy to the electrical system from an energy source connected to at least one of the plurality of circuit breakers.

Another embodiment of the present disclosure includes a method for controlling energy to at least one electrical component. The method includes an operation of transmitting a first control signal from a control module to a first slave module on a communication bus, the first slave module comprising a first switching device disposed between a first energy source and a power bus and wherein the first control signal opens the first switching device causing the energy from the first energy source to un-energize the power bus. The method also includes the operation of transmitting a second control signal from the control module to a second slave module on the communication bus, the second slave module comprising a second switching device disposed between a second energy source and the power bus and wherein the second control signal closes the second switching device causing the energy from the second energy source to energize the power bus. In this embodiment, the first energy source may be a utility energy source and the second energy source may be an alternative energy source.

BRIEF DESCRIPTION OF THE DRAWINGS

Referring now to the attached drawings which form a part of this original disclosure.

DETAILED DESCRIPTION

Aspects of the present disclosure involve systems, methods, and the like, of an energy interface system for interfacing alternative energy sources with a utility power source on a premises. As used herein, alternative energy source or sources includes any energy sources additional to a utility energy source, including one or more renewable energy sources, one or more standby sources and/or one or more electrical vehicles, added to a utility power source on a premises. The energy interface system provides a convenient interface for connecting one or more alternative energy sources on a local premises in addition to a utility power source connection. The energy interface system also provides flexibility in the use and distribution of utility energy sources and alternative energy sources based on several measurements and criteria of the interface system. For example, the energy interface system may allow for the energy consumption to adapt to changing parameters, such as utility rate schedules, cost of alternative fuels and utility premiums for consumption or generation of energy at particular times. The energy interface system also allows for deferment of charging or other high-energy loads to be recognized by the system at otherwise low-energy times. In addition, the energy interface system described herein allows for monitoring and communication with the system for ease of configuring the system based on one or more criteria or measurements.

Figure 4:
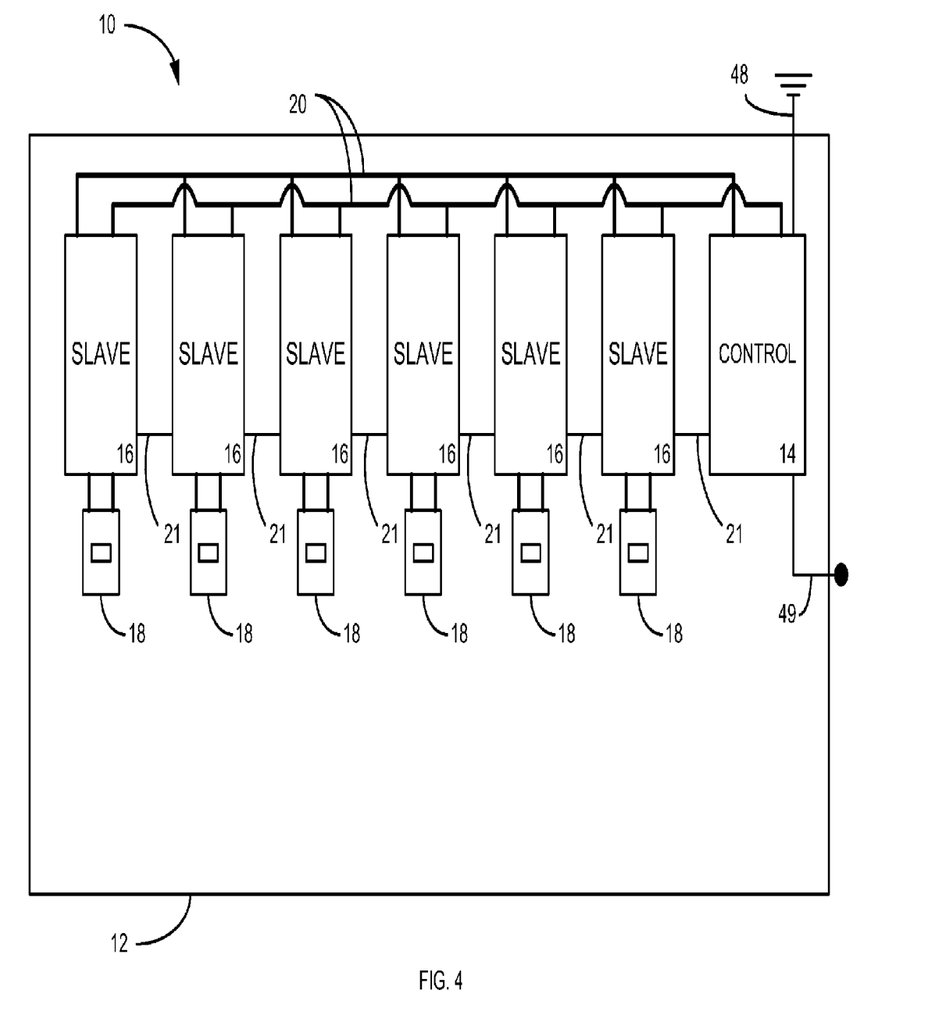
FIG. 4 is a schematic diagram of an energy interface system according to an embodiment of the present invention.

FIG. 4 illustrates an energy interface system 10 in accordance with an embodiment of the present disclosure. The energy interface system 10 includes one or more energy interface units 12 for interfacing alternative energy sources with a utility power source. The energy interface unit 12 includes a control module 14 and any number of slave modules 16 connected by a power distribution bus 20. Each slave module 16 is electrically connected to a circuit breaker 18 or, in some embodiments, a wire termination that provides a connection point for energy sources with the interface unit 12, as described in more detail below. A communication bus 21 connects the slave modules 16 to the control module 14. While the communication bus 21 of FIG. 4 shows the slave modules 16 connected in a serial connection, it should be appreciated that the communication bus 21 may take any form that allows for communication between the control module 14 and the slave modules. For example, communication bus 21 may take the form a plurality of communication lines between the slave modules 16 and the control module 14. In another example, control module 14 may communicate with slave modules 16 wirelessly over a wireless communication network. The energy interface unit 12 may also include a neutral bus (not shown) and, as discussed in more detail below, an antenna 48 or other transmitting/receiving device and/or other external communication port 49 for transmitting and/or receiving one or more control signals from an external source.

The plurality of circuit breakers 18 of the energy interface unit 12 offer several safety features for the interface system 10. For example, the circuit breakers 18 may provide automatic protection from a pre-determined high current from one or more alternative energy sources into the energy interface unit 12. Another safety feature includes the accessibility at the exterior of the energy interface unit 12 permitting the circuit breakers 18 to function as disconnect devices that may comply with the National Electric Code. The circuit breakers 18 may be configured to be locked by a padlock, for example. Another possible embodiment of the disconnect function includes an external handle that operates one or more of the circuit breaker 18 by cable or other means connected to one or more of the circuit breakers.

The control module 14 controls the operation of the slave modules 16 by sending one or more control signals via the communications bus 21 to one or more of the slave modules. In some instances, the control signals may be transmitted to the slave modules 16 in response to a changing condition or measurement of the system, or in response to a command received at the control module from an external system or operator. In addition, the slave modules 16 may transmit data regarding load and usage to the control module 14 via the communications bus 21 that may be stored or transmitted to an external system or operator. Through these communications, the control module 14 provides more flexibility and a smarter management of the energy sources connected to the energy interface unit 12.

Figure 5:
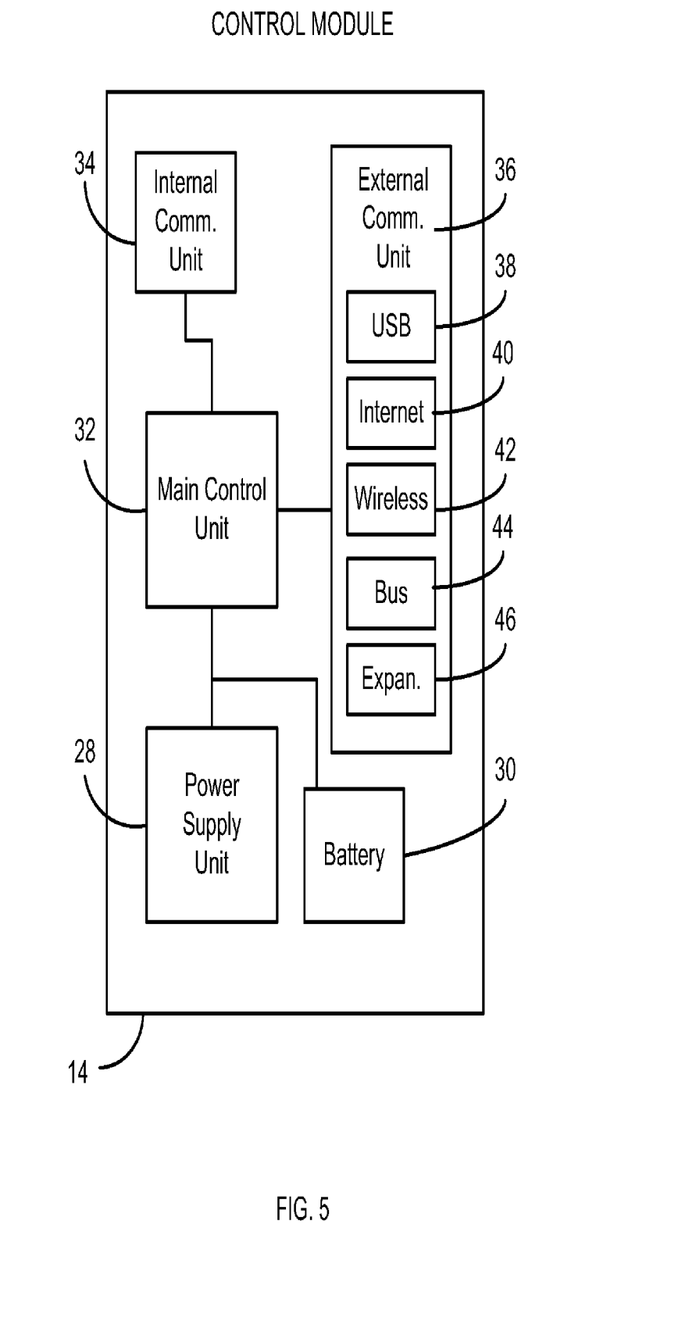
FIG. 5 is a block diagram of a control module of the energy interface system according to an embodiment of the present invention.

Referring now to FIG. 5, the control module 14 includes a power supply unit 28, an optional battery 30 or provisions for connecting to an external battery, a main control unit 32, an internal communications unit 34 and an external communications unit 36. In general, the power supply unit 28 provides power to the components of the control module 14. For example, in one embodiment, the power supply unit 28 may provide power to the main control unit 32 and other units of the control module. Also, in some embodiments, the power supply unit 28 may provide power or a power enable signal on the communications bus 21 to power the one or more slave modules 16. The power supply unit 28 may draw upon the utility power source or one or more alternative energy sources connected to the energy interface unit 12 through power bus 20 to provide the power to the units 28, 30,32, 34, 36 and modules 14, 16. Alternatively or in conjunction, a battery 30 may be included in the control module 14 to supply power to the control module 14 and/or the slave modules 16, such as, for example, in the event that the utility power source is lost or until an alternate energy source can be switched on. The control module 14 may also recharge the battery 30 from the connected energy sources should the battery begin to lose power.

The main control unit 32 of the control module 14 houses a microprocessor (not shown) or other processing device that runs a control program that controls the various functions of the control module 14, as discussed below. The main control unit 32 can also include a dynamic storage device, referred to as main memory, or a random access memory (RAM) or other computer-readable devices coupled to the processor for storing information and instructions to be executed. Main memory also may be used for storing temporary variables or other intermediate information during execution of instructions by the processor. Main control unit 32 may include a read only memory (ROM) and/or other static storage device for storing static information and instructions for the processor.

According to one embodiment, the techniques described herein may be performed by main control unit 32 in response to the processor executing one or more sequences of one or more instructions contained in main memory. These instructions may be read into main memory from another machine-readable medium, such as a storage device. Execution of the sequences of instructions contained in main memory may cause the processor to perform the process steps described herein. In alternative embodiments, circuitry may be used in place of or in combination with the software instructions. Thus, embodiments of the present disclosure may include both hardware and software components.

Returning to FIG. 4, communication bus 21 of the energy interface unit 12 sends power to the slave modules 16 and the control module 14, as well as provides a line of communication for the control module and the slave modules. In one particular embodiment, the bus 21 includes a ribbon cable with insulation displacement connectors staked thereon to connect the slave modules 16 to the control module 14. In another embodiment, the bus 21 may be a backplane printed circuit board (PCB). In yet another embodiment, the bus 21 may be a plurality of wireless signal transceivers. As shown in FIG. 5, the internal communications unit 34 of the control module 14 is connected to the bus 21 (FIG. 4) to communicate with the slave modules 16. The internal communication unit 34 is in general communication with the main control unit 32 and acts as a gateway for data transmission to and from the main control unit 32. In one embodiment, each slave module 16 has its own communication line with the internal communications unit 34. In this embodiment, the bus 20 includes serial data communications using the RS485 standard. It will be apparent to one of ordinary skill in the art from this disclosure that the bus 21 can be a parallel or a wireless bus. One of ordinary skill in the art will also recognize from this disclosure that other standards for data communication can be used, e.g., RS232. RS422 or RS423.

Figure 7:
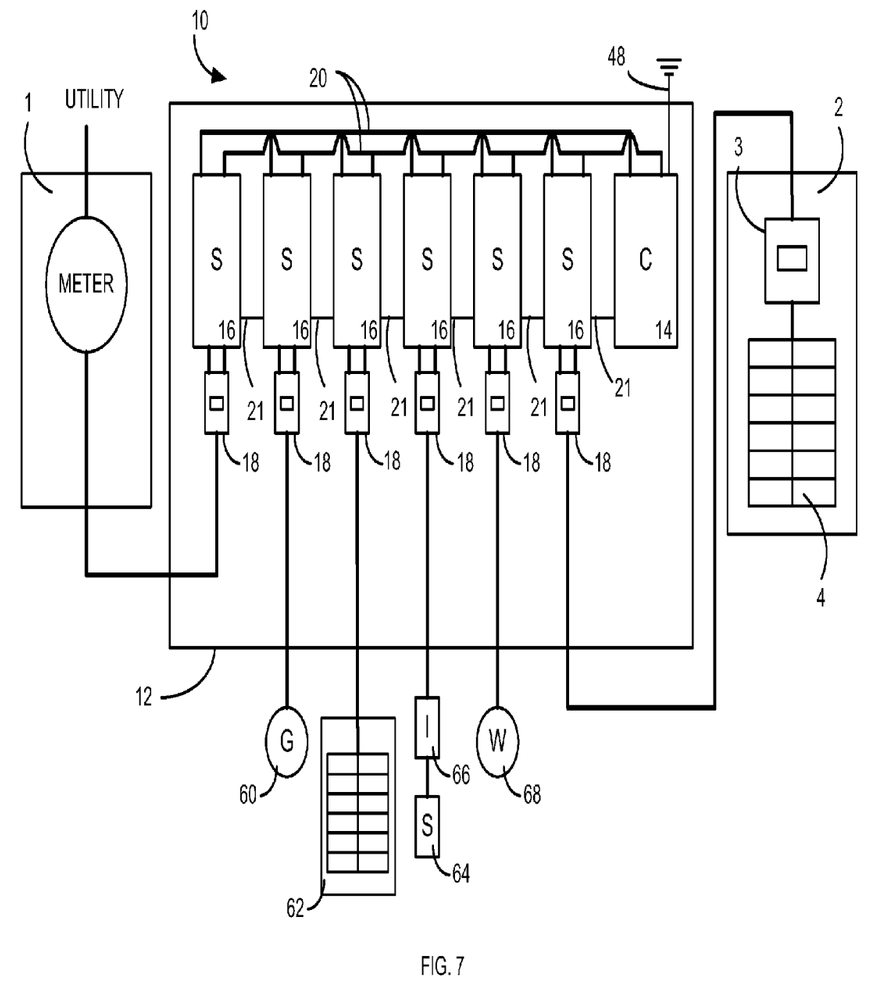
FIG. 7 is a schematic diagram of the energy interface system interfacing a utility power source with a load center.

An external communications unit 36 may also be connected to the main control unit 32 to receive and transmit data to/from an external source. In general, the main control unit 32 is configured to access external sources of data and/or commands through the external communications unit 36. The external communications unit 36 includes any number of varying communication ports, such as a USB port 38, an internet connection 40, a wireless connection 42, a bus extension 44 and an expansion connection port 46. The USB port 38 and the internet connection 40 are for direct, wired connections with data storage or monitoring systems, such as a communications network. The wireless connection 42 includes optional transceivers for RF, Zigbee®, cellular, Bluetooth® or other wireless communications. Alternatively, or in addition to, the wireless connection 42 may also include an Ethernet termination for connection with a router for access to the internet to transmit and receive information from a network. As shown in FIGS. 4 and 7, an internal or external antenna 48 may be provided to assist the wireless communication. The bus extension 44 (FIG. 5) is a communication port for serial communications with additional iterations of the invention. For example, a plurality of the energy units 12 depicted in FIG. 4 may be connected at its respective bus extension 44 to constitute an energy interface system 10 in industrial applications that comprise a plurality of energy interface units. By connecting the plurality of energy interface units 12 with a communication line from the respective bus extensions 44, one control module 14 can communicate with and/or control many energy interface units 12, along with their slave modules 16, such that the energy interface system 10 can be utilized at larger installations, such as commercial or industrial buildings. The expansion connection port 46 of the external communications unit 36 provides a space for additional means of communication, such as a power line carrier communication (PLCC) device, to be plugged into the control module 14.

Figure 6:
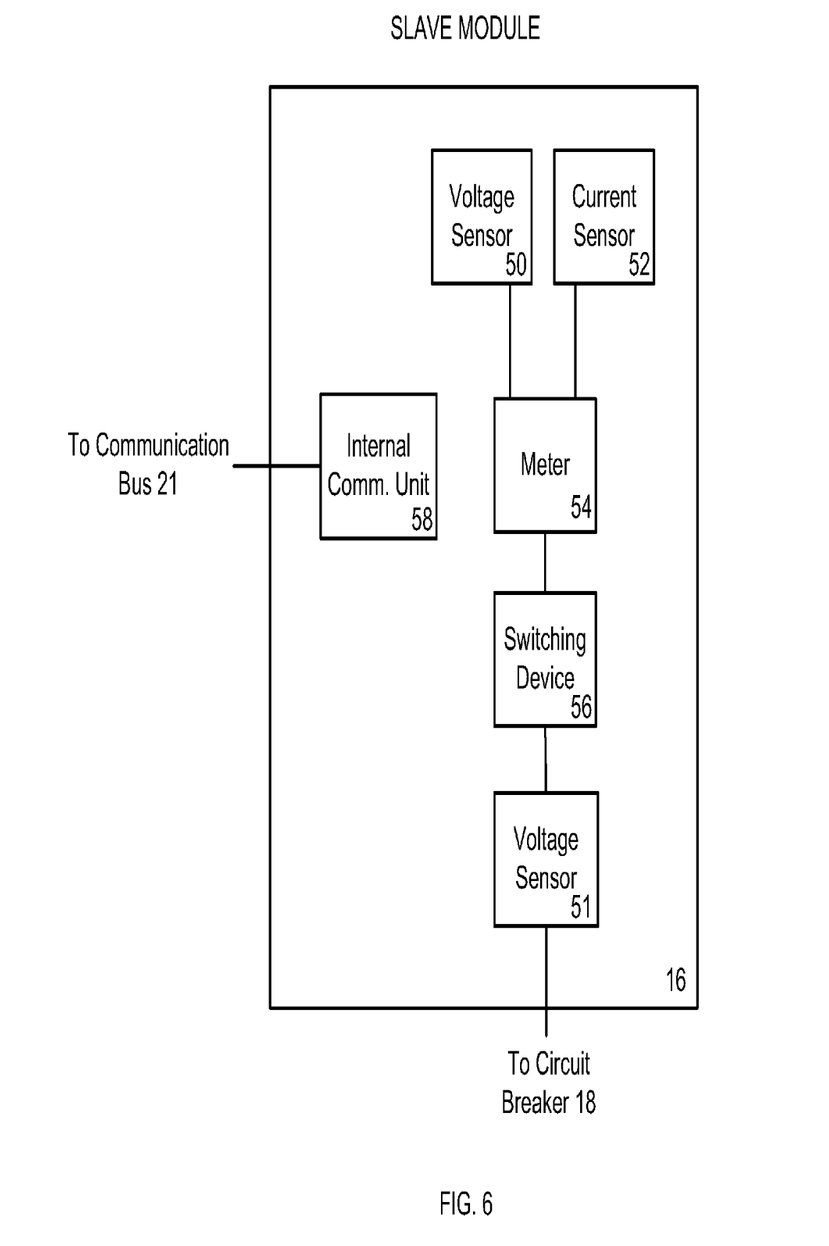
FIG. 6 is a block diagram of a slave module of the energy interface system according to an embodiment of the present invention.

Referring now to FIG. 6, the slave module 16 of the energy interface unit 12 is shown. In general, the slave module 16 includes a first voltage sensor 50, a second voltage sensor 51, a current sensor 52, a meter circuit 54, a switching device 56 and an internal communications unit 58. As shown in FIG. 4, the switching device 56 of the slave module 16 provides a bi-stable switch (or on/off switch) between the line bus 20 and the circuit breaker 18 that is controllable by the control module 14. To facilitate this control, the control module 14 may provide a control signal to the slave module 16 on the control bus 21 to open and close the switching device 56. Thus, although not shown in FIG. 6, the switching device 56 may be in communication with the internal communication unit 58 to provide control module control of the switching device. Similarly, other components of the slave module 16 may also be in communication with the internal communication unit 58 for providing information and/or receiving command signals from the control module 14.

Returning to FIG. 6, the first voltage sensor 50 is in electrical communication with the voltage line bus 20 (FIG. 4) and configured to measure voltages at the line side of the switching device 56. Similarly, the second voltage sensor 51 is connected to the breaker 18 and configured to measure voltage at the output of the switching device 56 at the breaker side. The first voltage sensor 50 and the second voltage sensor 51 may provide data associated with the measured voltages to the control module 14 through the internal communications unit 58 so that the main control unit 32 (FIG. 5) can verify the status of the source or loads on the load side of the switching device 56. In a similar manner, the current sensor 52 is electrically connected to the line bus 20 and may measure and report a current reading at the line side of the switching device 56.

A meter circuit 54 may be included in the slave module 16 that includes an integrated circuit that accepts inputs from the first voltage sensor 50 and the current sensor 52 for power readings. Specifically, a processor in the meter circuit 54 may process the inputs from the first voltage sensor 50 and the current sensor 52 and transmit such information to the control module 14, thereby providing for utility grade metering capability. The meter circuit 54 may also communicate with the control module 14 through the bus 21 to permit the control module 14 to exercise its programmed strategy. The transmission may occur through the internal communications unit 58, which is connected to the internal communications unit 34 of the control module 14 via the bus 21.

As previously discussed, the control module 14 (FIG. 4) may utilize the sensors and switching device 56 of the slave module 16 in response to changes in the operation of the energy interface system. In one example, the utility power source may be lost and an alternative energy power source is desired. The control module 14, through the second voltage sensor 51 in the slave module 16, will verify that a proper amount of voltage is present from the generator. More particularly, the second voltage sensor 51 may measure the voltage at the breaker side of the switch and provide the measured voltage to the control module 14 through the internal communication unit 58. If a proper amount of voltage is detected, the control module 14 may transmit a control signal to engage the switching device 56 of the slave module 16 to the closed position. When a stable voltage from the utility power source is sensed by the second voltage sensor 51, the control module 14 will initiate a programmed sequence to return the energy interface system 10 to using the utility power source.

Figure 8:
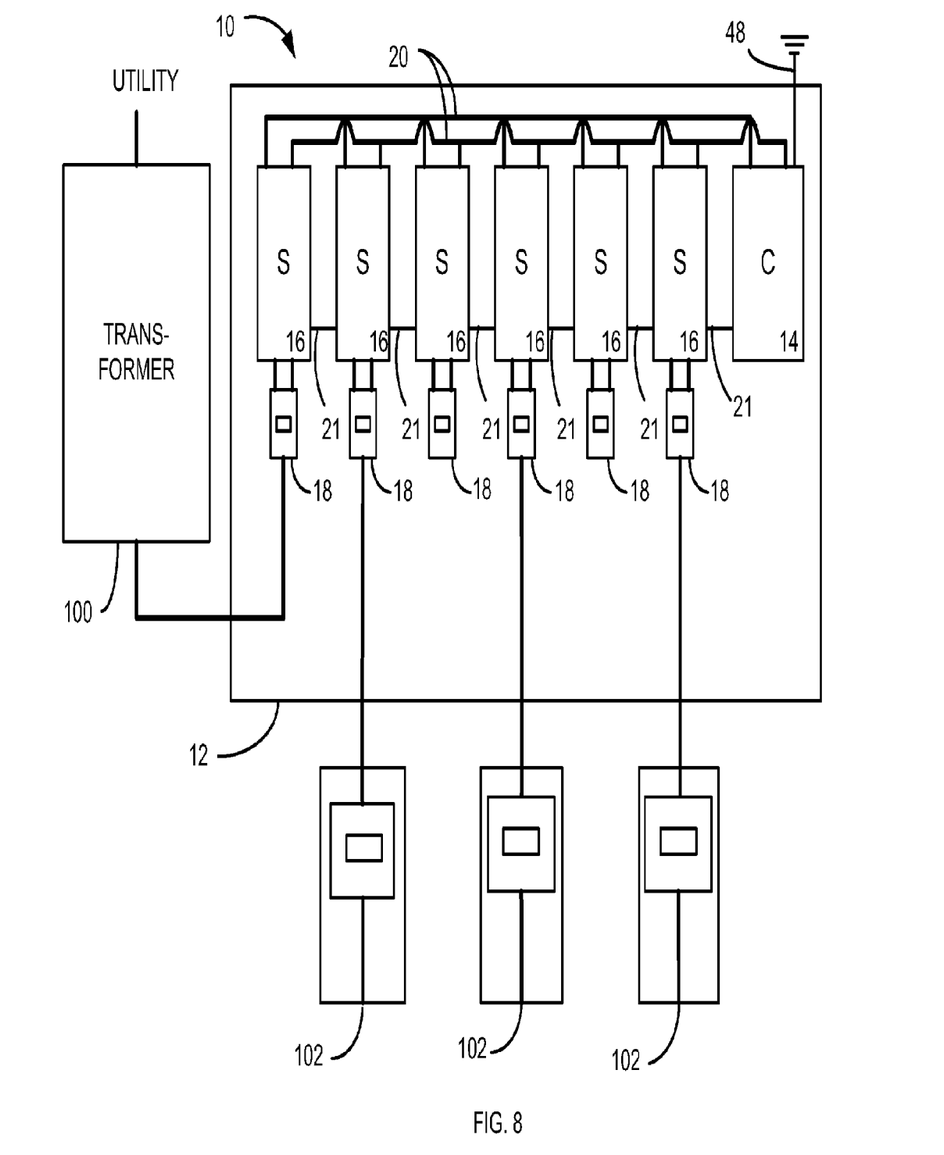
FIG. 8 is a schematic diagram of the energy interface system interfacing a utility transformer source.

Referring now to FIG. 7, the energy interface system 10 is shown interfaced between the meter 1 and the load center 2 of FIG. 1A. Thus, the energy interface system 10 may be used with a residential, 120/240 volt single phase system that is rated at about 200 amperes, for example. However, it will be apparent to one of ordinary skill in the art from this disclosure that the system could be adapted to any single phase or three phase, low voltage (about 600 volt or less) system typically used in the United States. Additionally, it is envisioned that the energy interface system 10 may be implemented in other aspects of the power grid, as will be discussed with reference to FIG. 8.

One advantage of the present disclosure is that the energy interface system 10 can be retrofitted to existing premises' electrical services. Further, the energy interface system 10 permits the connection of multiple alternative energy sources or loads to one interface that complies with the National Electric Code requirements for visible disconnect switches. More particularly and shown in FIG. 7, the existing meter socket 1 is connected to the energy interface system 10 through one of the circuit breakers 18. In this example, the circuit breaker 18 may be a 200 ampere circuit breaker. The energy interface system 10 is also connected to the load center 2 through another circuit breaker 18. However, in some embodiments, the load center 2 may be connected to the energy interface system 10 through a wire terminal (not shown) without a circuit breaker since the load center 2 also contains the main circuit breaker 3. By connecting the switching device of the slave module 16 in series between the utility connection and the load center 2, the energy interface system 10 may disconnect from the grid to operate "off the grid" in response to one or more control signals from the control module 14.

One example of the energy interface system 10 allowing the connected loads to work off the grid is as follows. A standby power source, such as a generator 60, may be connected through the circuit breaker 18. A non-critical load center 62 is also connected to the energy interface system 10 through a separate circuit breaker 18. The non-critical load center 62 is generally a panel board or load center that services loads which may not be required in the event of a loss of utility power. When power loss from the utility is detected at the slave module 16 connected to the utility, the control module 14 may engage the switch of the slave module to turn off the utility power. The control module 14 may also engage the switching device of the slave module 16 connected to the generator 60 to close the switch such that the generator may supply power to the premises. Additionally, the control module 14 may open the switching device of the slave module 16 connected to the non-critical load center 62 to remove those loads from the system. When energy from the utility returns (as detected at the slave module 16), the control module 14 may then send one or more control signals to return the energy interface system 10 to utility power.

This configuration of the energy interface system 10 permits an alternative energy source, such as a generator 60 with capacity less than that needed by the entire premises, to power critical loads in the event of a utility power loss without wasting capacity on non-critical loads. In this manner, one slave module 16 may switch off several or even dozens of non-critical loads when appropriate.

Similarly, any additional alternative or renewable energy source may be interfaced into the energy system through the energy interface system 10 to provide energy when the utility energy source is removed. For example, a renewable energy source, such as a solar array 64, is connected through an inverter 66 to the circuit breaker 18. Another renewable energy source, an induction wind generator 68, may also be connected to a separate slave module 16 through the circuit breaker 18. As a result, the energy interface system 10 permits the connection of multiple alternative energy sources to a distribution load center 2 without utilizing any branch breaker connections 4 in the load center 2, keeping those breaker connections free for other connections.

To facilitate the conversion to an alternative energy source, the control module 14 may be programmable for automatic operation. That is, the control module 14 may control the slave modules 16 automatically by executing software programs. More particularly, the processor of the main control unit 32 (FIG. 5) may execute one or more programs. These programs may cause the main control unit 32 to transmit one or more control signals to the slave modules 16 to control the connections within the energy interface system 10. Thus, continuing the above example, when a loss of utility power is detected, the main control unit 32 may automatically execute a program to switch the power to the back-up generator energy source 60 in the manner described above without the need for manual operation of the control module. In another example, the main control unit 32 may automatically switch to a renewable alternative energy source when the system 10 detects that the renewable alternative energy source has achieved enough energy to power the devices connected to the system. Additionally, when the system 10 detects that the renewable energy source does not have enough energy to power the system, the control module 14 may automatically return to using utility power.

Further, the control module 14 may be configured to store one or more executable programs which reflect and respond to an operational strategy of the user of the system 10. For example, the energy interface module may be configured to consider which of the energy sources connected to the interface system 10 provides the most reliability, which source is the most costly to receive energy from, which source provides the lowest overhead for the user and so forth. These considerations may be selected at the time of installation and may be changed at a later date through the external communications unit 36. In general, any operational measurement or state of the interface system 10 may be considered by the control module 14 when the system is in use. In addition, other parameters of the system 10 may also be considered by the control module 14, such as time of day, day of the week, time of year, energy consumption measurements received from the utility company, states of alternative energy sources, and any other measurements of the energy system 10 and components connected to the energy system.

To that end, the control module 14 may also store one or more user profiles that coincide with the users of the interface system 10 or with different profiles that may be selected by a single user. Thus, each program stored under the profile may be for one or more operations performed by the energy interface system 10. For example, the profile may store a program for controlling the energy interface system to consume the least cost during the winter, a program for managing load and consumption at peak times during the summer, a program for charging a battery source at night, a program to return power back to the grid during peak times, a program to account and manage credits available from the utility company for providing energy to the system and so forth. In general, any preferences and/or customizations can be stored under the user profile that responds to a measurement, time or condition of the energy interface system 10 to configure the system accordingly. User profiles may be programmed into the control module 14 at installation, or they may be uploaded through the external communication port 36 following installation.

In addition, the control module 14 may also report statuses of the system to a server through the Internet or other communication port to enable monitoring or adjusting system performance by a remote device or remote user. For example, the system 10 may send updates through the external communications unit 36 of the control module 14 and to a communication network that transmits the information to a personal computer (PC) or other computing device. In one example, the system information may be sent through an Internet connection. In another example, the system information may be transmitted through a wireless communication network utilizing the antenna 48. Upon receipt of the system information, the computing device or operator of the computing device may monitor and/or adjust the control module 14 in response to the energy measurements and/or conditions of the system. Computing devices, as used herein, include a PC connected to the Internet or a wireless connection with, for example, a "smart phone" or other display module. In this manner, the monitoring of the energy interface system 10 can be done remotely. For example, the monitoring may include a display of meter readings, status and other data through a web site or on wireless handheld technology, such as a smartphone, PDA, cell phone, or the like. Monitoring may also include transfer of alerts or status events based on power events, such as power loss, through electronic mail (e-mail), based potentially on a user preference.

In response to receiving the system information at the remote display, a remote device or remote user may configure the energy interface system accordingly. For example, any of the programs described above may be performed by the remote computing device to configure the system 10. Thus, the remote computing device may provide one or more control signals to control module 14 (utilizing the external communication unit 36 of the control module) to configure the slave module 14 in response to changing energy consumption conditions, the time of day, week or year, availability of alternative energy sources, information received from the utility company (such as to respond to a rolling blackout or potential refund for cutting energy use) and the like. In general, the remote computing device may perform any function described herein for the main control unit 32 of the control module 14. Similarly, the system 10 may be configured by a user in response to the system information received at the remote display by providing one or more control signals to the system, either through the external communications unit 36 of the control module or manually at the site of the interface system.

The energy interface system 10 is also capable of data storage for subsequent monitoring and review. The control module 14 can store data, profiles and programs in internal memory, such as the internal memory device for local use. The control module 14 optionally utilizes the external communications unit 36 to store data at a remote server. The server may be accessible via the Internet and a web page can display user-selected data on the server. In a commercial or industrial setting, where a plurality of energy interface units 12 are in use, the control module 14 sends data via an intranet to a server for internal monitoring.

The present invention provides the capability to connect to a server to allow system registration, selection of operating preferences, storage and retrieval of operational data, such as kilowatt-hour performance of each energy interface unit 12 in the energy interface system 10, software updates, provisions for maintenance alerts and many other valuable functions through a website.

The energy interface system 10 can control energy consuming units or loads at a remote location in coordination with parameters in a user selected program. For example, the control module 14 of the energy interface system 10 can control heating and air conditioning having a thermostat equipped with wireless communications for communication with the external communication unit 36. The wireless communications can be used to control the wireless thermostat to allow or inhibit large heating or air conditioning loads when required to reduce loads. In yet another example, the control module 14 controls one or more appliances equipped with wireless communication. Communications with energy consuming units or loads could also be accomplished through a PLCC based interface. Thus, the energy interface system 10 monitors the energy production of alternative energy sources and the consumption of energy by various loads to autonomously switch the alternative energy sources and loads on or off to conform to the pre-programmed user profile. The user can download other operating profile programs from the World Wide Web for implementation at the control module 14 of the energy interface system 10.

As stated above, the energy interface system 10 may be located anywhere on the low voltage distribution side of the energy grid to provide an interface system. Thus, as shown in FIG. 7, the energy interface system 10 may be located between the metering socket 1 and the load center 2. In another example shown in FIG. 8, the interface system 10 may be located between a transformer 100 of the energy grid and one or more customers 102 connected to the grid. In this example, the service 102 for a residential or business premises may connect to the energy grid through the one or more slave modules 16 of the energy interface system 10. Such a configuration would permit remote access to the energy usage information, as well as providing on/off control of each customer without requiring a separate meter at each user premises. As such, a user of the interface system 10 (such as the utility company) may utilize the system to control the power transmitted to and received from the customer connections 102. The energy interface system 10 may include similar components and functionality as the examples described above, allowing a user of the interface system local or remote access to configure, control and measure the components connected to the interface system. In this manner, the energy interface system 10 may be implemented at any point in the low voltage energy grid to provide control over the components connected to the interface system.

In another embodiment, the energy interface system 10 may be incorporated onto a mobile structure to provide a portable microgrid for in the field applications. In use, the portable energy interface system 10 may connect to a utility through a traditional means and provide a plurality of connection points for electrical components to connect to the power grid, including portable structures and/or components that may be moved from a site. The energy interface system 10, in this embodiment, provides a portable connection point for the components that may be controlled through the control module, as described above.

Further, although the energy interface system 10 has been illustrated in FIGS. 4-8 as being capable of controlling six alternative energy sources or loads, it will be apparent to one of ordinary skill in the art from this disclosure that more or less than six slave modules 16 could be utilized. Furthermore, it should be obvious from this disclosure to those skilled in the art that the sources or loads that could be connected are not limited to those illustrated or mentioned.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An energy interface system comprising:
   a control module;
   a plurality of slave modules in wireless communication with the control module, each of the plurality of slave modules comprising a switching device;
   a plurality of circuit breakers electrically connected to the plurality of slave modules and configured to provide an electrical junction between the switching device and an electrical system; and
   an internal communication unit coupled to the control module configured to wirelessly transmit one or more control signals from the control module to at least one of the plurality of slave modules, wherein the control signals enable the switching device of at the least one of the plurality of slave modules to provide energy to the electrical system from an energy source connected to at least one of the plurality of circuit breakers.

2. The energy interface system of claim 1 wherein the control module further comprises:
   an external communication unit configured to receive instructions from a remote computing device in communication with the external communication unit, wherein the instructions cause the control module to transmit the one or more control signals.

3. The energy interface system of claim 2 wherein the external communication unit comprises:
   a network communication port for connecting to the Internet.

4. The energy interface system of claim 2 wherein the external communication unit comprises:
   an antenna; and
   a wireless communication port, wherein the antenna and wireless communication port are configured to wirelessly receive the instructions.

5. The energy interface system of claim 1 wherein at least one alternative energy source is electrically connected to at least one of the plurality of circuit breakers.

6. The energy interface system of claim 1 wherein the energy source comprises a utility energy source.

7. The energy interface system of claim 5 wherein the energy source comprises the at least one alternative energy source.

8. A method for controlling energy to at least one electrical component, the method comprising:
wirelessly transmitting a first control signal from an internal communication unit of a control module to a wireless transceiver of a first slave module, the first slave module comprising a first switching device disposed between a first energy source and a power bus and wherein the first control signal opens the first switching device causing the energy from the first energy source to un-energize the power bus; and
wirelessly transmitting a second control signal from the internal communication unit of the control module to a wireless transceiver of a second slave module on the communication bus, the second slave module comprising a second switching device disposed between a second energy source and the power bus and wherein the second control signal closes the second switching device causing the energy from the second energy source to energize the power bus;
wherein the first energy source is a utility energy source and the second energy source is an alternative energy source.

9. The method for controlling energy to at least one electrical component of claim 8 further comprising:
receiving at least one instruction from a remote computing device on an external communication unit and, in response to receiving the at least one instruction, transmitting the first control signal and the second control signal.

10. The method for controlling energy to at least one electrical component of claim 9 further comprising:
transmitting at least one received measurement associated with the first slave module to a remote computing device utilizing an external communication unit.

11. The method for controlling energy to at least one electrical component of claim 9 further comprising:
storing a user profile in a computer-readable medium and wherein wirelessly transmitting the first control signal and wirelessly transmitting the second control signal is based at least on the stored user profile.

12. The method for controlling energy to at least one electrical component of claim 8 further comprising:
receiving a voltage measurement of the power bus from a first voltage sensor associated with the second slave module; and
receiving a voltage measurement of the second energy source from a second voltage sensor associated with the second slave module.

13. The method for controlling energy to at least one electrical component of claim 8 further comprising:
wirelessly transmitting a third control signal from the internal communication unit of the control module to a wireless transceiver of the second slave module, wherein the third control signal opens the second switching device.

14. The method for controlling energy to at least one electrical component of claim 8 further comprising: maintaining a date and time and wherein wirelessly transmitting the first control signal and wirelessly transmitting the second control signal is based at least on a time of day.

15. A system for interfacing a plurality of energy sources comprising:
a control module;
a plurality of slave modules in wireless communication with the control module, each of the plurality of slave modules comprising a switching device, wherein at least one of the slave modules is electrically connected between a transformer device and a residential electrical system; and
an internal communication unit coupled to the control module configured to wirelessly transmit one or more control signals from the control module to the at least one of the plurality of slave modules, wherein the control signals enable the switching device of the at least one of the plurality of slave modules to provide energy to the residential electrical system from the transformer device.

16. The system of claim 15 wherein the control module further comprises:
a processing device; and
a computer readable medium configured to store executable instructions, that when executed by the processing device, cause the control module to transmit the one or more control signals to enable switching the device.

17. The system of claim 15 wherein the control module further comprises:
an external communication unit configured to receive instructions from a remote computing device in communication with the external communication unit, wherein the instructions cause the control module to transmit the one or more control signals.

18. The system of claim 15 wherein the at least one of the plurality of slave modules further comprises:
a first voltage sensor configured to measure a voltage at the transformer device and wherein the at least one of the plurality of slave modules is configured to transmit the voltage measurement at the first voltage sensor to the control module.

19. The system of claim 18 further comprising:
a second voltage sensor configured to measure a voltage at a line side of at least one of the plurality of slave modules and to transmit the voltage measurement at the voltage sensor to the control module.

20. The system of claim 15 wherein the at least one of the plurality of slave modules further comprises:
a metering circuit configured to measure a voltage and current of the at least one of the plurality of slave modules and provide electrical power metering capabilities based on the measured voltage and current of the at least one of the plurality of slave modules.

21. The system of claim 15 further comprising:
at least one circuit breaker electrically connected to the at least one of the plurality of slave modules and configured to provide an electrical junction between the switching device and the residential electrical system.

22. The system of claim 15 wherein the switching device of the at least one of the plurality of slave modules is configured to disconnect the transformer from the residential electrical system in response to at least one command from the control module.

* * * * *